US012754572B2

(12) United States Patent
Wahl

(10) Patent No.: US 12,754,572 B2
(45) Date of Patent: Oct. 6, 2026

(54) METHOD OF CLOSED-LOOP CONTROLLING A PIEZOELECTRIC VALVE DEVICE, CONTROLLER DEVICE AND FLUIDIC SYSTEM

(71) Applicant: Festo SE & Co. KG, Esslingen (DE)

(72) Inventor: Mathias Wahl, Eislingen (DE)

(73) Assignee: Festo SE & Co. KG, Esslingen (DE)

( * ) Notice: Subject to any disclaimer, the term of this patent is extended or adjusted under 35 U.S.C. 154(b) by 671 days.

(21) Appl. No.: 18/081,031

(22) Filed: Dec. 14, 2022

(65) Prior Publication Data

US 2023/0185318 A1 Jun. 15, 2023

(51) Int. Cl.
*G05D 16/20* (2006.01)
*F16K 31/00* (2006.01)
*G05B 6/02* (2006.01)

(52) U.S. Cl.
CPC ....... *G05D 16/2013* (2013.01); *F16K 31/004* (2013.01); *G05B 6/02* (2013.01)

(58) Field of Classification Search
CPC ........... G05D 16/2013; G05D 16/2026; G05D 16/20; F16K 31/004; F16K 31/02; G05B 6/02; G05B 13/02; G05B 11/40; F15B 19/002; F15B 19/005; F15B 2211/30575; F15B 2211/327; F15B 2211/6306; F15B 2211/6309; F15B 2211/6313; F15B 2211/6653; F15B 2211/6656; F15B 11/006; F15B 21/087; F15B 21/08; F15B 13/044; F15B 20/002; H02N 2/0075
See application file for complete search history.

(56) References Cited

U.S. PATENT DOCUMENTS

| | | | | |
|---|---|---|---|---|
| 6,255,760 B1 * | 7/2001 | Hasegawa | G01C 19/5607 | 310/317 |
| 2002/0011762 A1 * | 1/2002 | Klenk | F02D 41/2096 | 310/316.03 |
| 2004/0200349 A1 * | 10/2004 | Moler | G05B 19/44 | 91/465 |
| 2016/0115896 A1 * | 4/2016 | Kanbara | F02D 41/403 | 123/478 |

(Continued)

FOREIGN PATENT DOCUMENTS

| | | |
|---|---|---|
| CN | 111188942 B | 6/2021 |
| DE | 101 01 678 A1 | 7/2002 |

(Continued)

OTHER PUBLICATIONS

German Examination Report.

*Primary Examiner* — Kenneth M Lo
*Assistant Examiner* — Mohammed Shafayet
(74) *Attorney, Agent, or Firm* — Hoffmann & Baron, LLP

(57) ABSTRACT

A method for closed-loop controlling, in particular closed-loop pressure controlling, a piezo valve device, including the steps:

calculating a control error integral signal representing a time integral of a control error of the closed-loop control of the piezo valve device, adjusting, based on the control error integral signal, at least one control opening voltage value defining within the closed-loop control an opening voltage value of a piezo valve of the piezo valve device, and using the adjusted at least one control opening voltage value, providing at least one drive voltage for driving the piezo valve within the closed-loop control.

19 Claims, 6 Drawing Sheets

(56) References Cited

U.S. PATENT DOCUMENTS

| | | | | |
|---|---|---|---|---|
| 2017/0045482 | A1* | 2/2017 | Goto | G05B 19/46 |
| 2018/0356845 | A1* | 12/2018 | Yasuda | F16K 31/004 |
| 2019/0017172 | A1* | 1/2019 | Yasuda | C23C 16/45544 |
| 2020/0278033 | A1* | 9/2020 | Kondo | F16K 7/14 |
| 2023/0064061 | A1* | 3/2023 | Matsukawa | F02D 41/0027 |

FOREIGN PATENT DOCUMENTS

| | | | |
|---|---|---|---|
| DE | 11 2004 000 574 | T5 | 2/2006 |
| DE | 10 2007 059 115 | B4 | 9/2021 |

* cited by examiner

METHOD OF CLOSED-LOOP CONTROLLING A PIEZOELECTRIC VALVE DEVICE, CONTROLLER DEVICE AND FLUIDIC SYSTEM

BACKGROUND OF THE INVENTION

The invention relates to a method for closed-loop controlling a piezo valve device.

The closed-loop control is preferably a closed-loop pressure control, for example a closed-loop control of an output pressure of the piezo valve device. The closed-loop pressure control is, for example, the closed-loop control of a fluid pressure in a pressure chamber that is aerated and/or deaerated via the piezo valve device. The piezo valve device has at least one piezo valve. The piezo valve has an opening voltage value. The opening voltage value is the voltage value with which the piezo valve must at least be driven so that it begins to open. The opening voltage value of the piezo valve is also referred to as the actual or real opening voltage value.

Typically, the real opening voltage value of the piezo valve changes with time, for example due to aging, a change in temperature, an applied differential pressure and/or a piezo effect. A change in the real opening voltage value can cause the quality of the closed-loop control to deteriorate. The performance of the closed-loop control includes, for example, the control quality, the bandwidth (e.g., the speed) of the control, and/or the fluid consumption of the control.

SUMMARY OF THE INVENTION

It is an object of the invention to provide a flexibly applicable method for closed-loop controlling a piezo valve device, with which method a high performance of the closed-loop control can be achieved even with a changing real opening voltage value.

The object is solved by a method according to claim 1. The method is used for closed-loop controlling, in particular for closed-loop pressure controlling, a piezo valve device. The method comprises the steps: Calculating a control error integral signal which represents a time integral of a control error of the closed-loop control of the piezo valve device, adjusting, on the basis of the control error integral signal, at least one control opening voltage value which defines within the control an opening voltage value of a piezo valve of the piezo valve device, and, using the control opening voltage value, providing a drive voltage for driving the piezo valve within the closed-loop control.

In the method, a control opening voltage value is used for the control. This control opening voltage value defines an opening voltage value of the piezo valve within the closed-loop control. The opening voltage value defined within the closed-loop control—i.e. the control opening voltage value—shall also be referred to as the simulated or imaginary opening voltage value. The control opening voltage value used within the closed-loop control does not necessarily have to have exactly the same value as the real opening voltage value of the piezo valve. Preferably, the control opening voltage value is selected so that it is smaller than the real opening voltage value of the piezo valve. Expediently, within the closed-loop control, the control opening voltage value is used to follow changes in the real opening voltage value. By using the control opening voltage value in the closed-loop control, the closed-loop control can be adapted to the real opening voltage value, in particular to a change in the real opening voltage value. In this way, a high performance of the closed-loop control can be achieved.

Typically, the real opening voltage value of the piezo valve cannot be determined directly during operation. For example, a direct determination of the real opening voltage value is not possible, or a direct determination of the opening voltage value would require a special driving of the piezo valve device (specifically aimed at the determination), for which the normal operation of the piezo valve device would have to be interrupted.

The method according to the invention is based on the knowledge that the real opening voltage value of the piezo valve has an effect on the control error integral signal—i.e. on the time integral of the control error of the closed-loop control. In particular, a change in the real opening voltage value causes a change in the control error integral signal. Consequently, the control opening voltage value can be adjusted on the basis of the control error integral signal, in particular in such a way that a change in the real opening voltage value is followed by the control opening voltage value. In this way, the control opening voltage value can be adapted according to the real opening voltage value without having to determine the real opening voltage value directly. This preferably allows the control opening voltage value to be adjusted during operation. Consequently, the method can be used flexibly—in particular also for applications in which pausing the closed-loop control for the purpose of adjusting the control opening voltage value is not possible or not desired.

Advantageous further developments are defined in the dependent claims.

The invention further relates to a controller device for closed-loop controlling, in particular closed-loop pressure controlling, a piezo valve device, the controller device being configured to calculate a control error integral signal which represents a time integral of a control error of the closed-loop control of the piezo valve device, to adapt, on the basis of the control error integral signal, at least one control opening voltage value which, within the closed-loop control, describes an opening voltage value of a piezo valve of the piezo valve device, and, using the control opening voltage value, to provide a drive voltage for driving the piezo valve within the closed-loop control.

Preferably, the controller device is adapted in correspondence to the method for closed-loop controlling the piezo valve device and/or is used for carrying out the method.

The invention further relates to a fluidic system comprising the controller device and the piezo valve device.

BRIEF DESCRIPTION OF THE DRAWINGS

Further exemplary details as well as exemplary embodiments are explained below with reference to the figures. Thereby shows FIG. 1 a schematic representation of a fluidic system, FIG. 2 a block diagram of a control loop, FIG. 3 a block diagram of a controller, FIG. 4 a diagram showing a real opening voltage value of a piezo valve, FIG. 5 a diagram showing different regions of operation of the closed-loop control, FIG. 6 a diagram showing a temporal course of a control error integral signal in a first region of operation, FIG. 7 a diagram showing a temporal course of a control error integral signal in a second region of operation, and FIG. 8 a flow diagram of a method for closed-loop controlling a piezo valve device.

DETAILED DESCRIPTION

Figure 1:
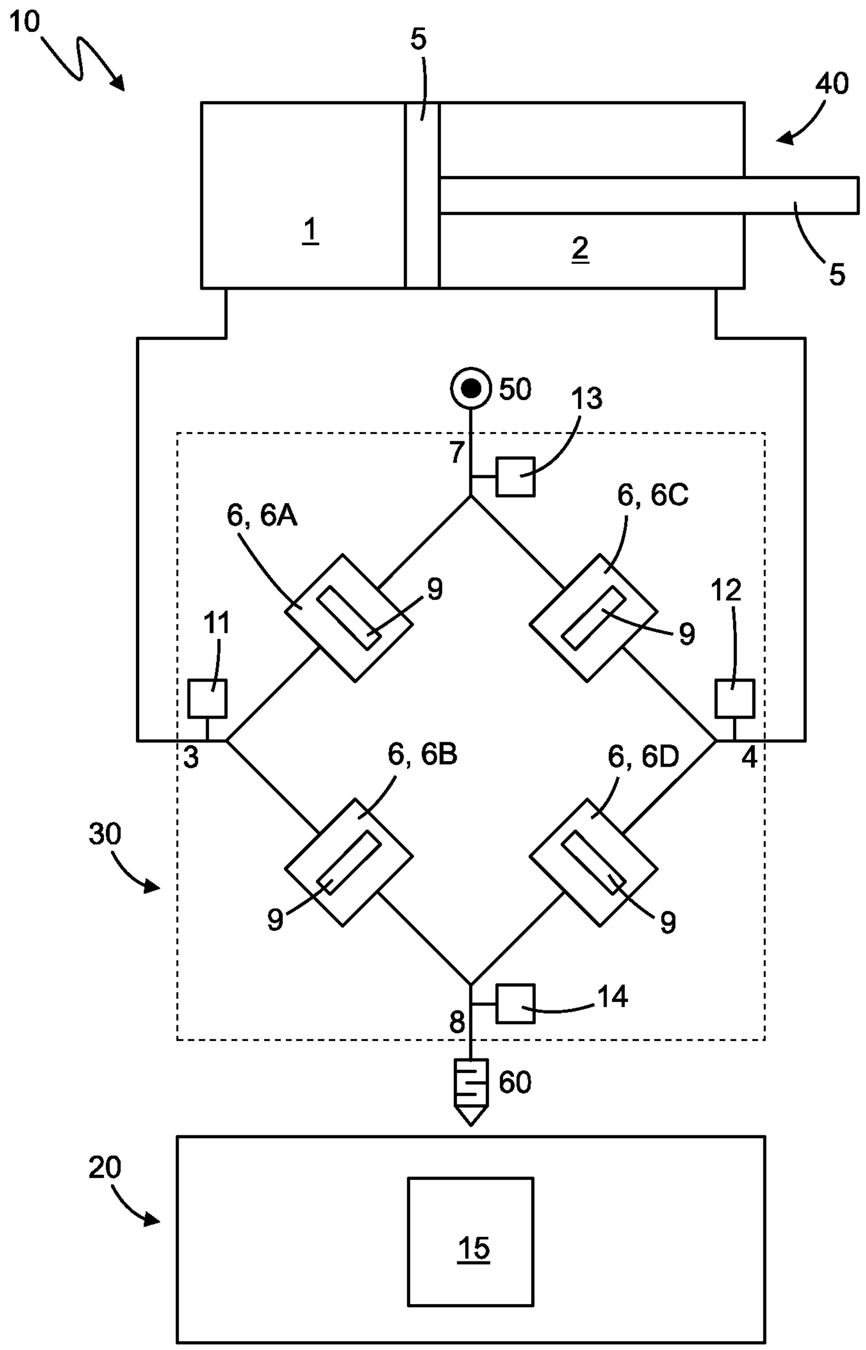

FIG. 1 shows a fluidic system 10 comprising a controller device 20 and a piezo valve device 30. Exemplarily, the fluidic system 10 further comprises a fluidic actuator 40. Preferably, the fluidic system 10 further comprises a pressurized fluid source 50 and/or a pressurized fluid sink 60. The pressurized fluid sink 60 is, for example, the environment of the piezo valve device 30, in particular the atmosphere. Preferably, the fluidic system 10 is a pneumatic system.

The fluidic system 10, in particular the controller device 20, the piezo valve device 30, and/or the fluidic actuator 40 is suitably designed for industrial automation. For example, an industrial plant comprising the fluidic system 10 is provided.

In particular, the fluidic system 10 serves as an exemplary application environment for the controller device 20. The controller device 20 may also be provided on its own—i.e., in particular without the piezo valve device 30 and/or without the fluidic actuator 40.

The fluidic actuator 40 is, for example, a pneumatic actuator. Preferably, the fluidic actuator 40 is a drive cylinder, in particular a pneumatic drive cylinder.

The fluidic actuator 40 comprises at least one pressure chamber to which pressurized fluid, in particular compressed air, can be supplied and/or discharged by means of the piezo valve device 30. Exemplarily, the fluidic actuator 40 comprises a first pressure chamber 1 and/or a second pressure chamber 2. Exemplarily, the first pressure chamber 1 is fluidically connected to a first working outlet 3 of the piezo valve device 30. Expediently, pressurized fluid, in particular compressed air, can be supplied to and/or discharged from the first pressure chamber 1 via the first working outlet 3. Exemplarily, the second pressure chamber 2 is fluidically connected to a second working outlet 4 of the piezo valve device 30. Expediently, pressurized fluid, in particular pressurized air, can be supplied to and/or discharged from the second pressure chamber 2 via the second working outlet 4.

Exemplarily, the fluidic actuator 40 comprises an actuator member 5, which is designed in particular as a piston arrangement. The actuator member 5 can be positioned via a pressure fluid actuation of the first pressure chamber 1 and/or the second pressure chamber 2.

The piezo valve device 30 comprises the first working outlet 3. The piezo valve device 30 comprises at least one piezo valve 6, via which pressurized fluid, in particular pressurized air, can be output at the first working outlet 3 or discharged (into the piezo valve device 30). Exemplarily, the piezo valve device 30 comprises a first piezo valve 6A, via which a fluidic connection of the first working outlet 3 with the pressurized fluid source 50 can be established or interrupted or adjusted in its degree of opening. Exemplarily, the piezo valve device 30 comprises a second piezo valve 6B, via which a fluidic connection of the first working outlet 3 with the pressurized fluid sink 60 can be established or interrupted or adjusted in its degree of opening.

Exemplarily, the piezo valve device 30 comprises the second working outlet 4. Exemplarily, the piezo valve device 30 comprises a third piezo valve 6C, via which a fluidic connection of the second working outlet 4 with the pressurized fluid source 50 can be established or interrupted or adjusted in its degree of opening. Exemplarily, the piezo valve device 30 comprises a fourth piezo valve 6D via which a fluidic connection of the second working outlet 4 with the pressurized fluid sink 60 can be established or interrupted or adjusted in its degree of opening.

Exemplarily, the piezo valve device 30 comprises a pressurized fluid input 7 for connection to the pressurized fluid source 50. Exemplarily, the first piezo valve 6A is connected between the pressurized fluid input 7 and the first working outlet 3. The third piezo valve 6C is exemplarily connected between the pressurized fluid input 7 and the second working outlet 4.

Exemplarily, the piezo valve device 30 includes a pressurized fluid output 8 for connection to the pressurized fluid sink 60. Exemplarily, the second piezo valve 6B is connected between the pressurized fluid output 8 and the first working outlet 3. The fourth piezo valve 6D is exemplarily connected between the pressure fluid output 8 and the second working outlet 4.

The piezo valve 6 is part of a bridge circuit of the piezo valve device 30. Preferably, the piezo valves 6A, 6B, 6C and 6D form a bridge circuit, in particular a full bridge.

Each piezo valve 6 is expediently designed as a 2/2-way valve, in particular as a 2/2-way proportional valve. Each piezo valve 6 has a respective valve element 9 via which a respective degree of opening of the respective piezo valve 6 can be set, in particular proportionally set.

The fluidic system 10, in particular the piezo valve device 30, expediently comprises a pressure sensor device for detecting one or more fluid pressures of the fluidic system 10. Exemplarily, the pressure sensor device comprises a first pressure sensor 11 for detecting a first output pressure of the first working outlet 3. The first output pressure expediently corresponds to the pressure in the first pressure chamber 1. Exemplarily, the pressure sensor device comprises a second pressure sensor 12 for detecting a second output pressure of the second working outlet 4. The second output pressure expediently corresponds to the pressure in the second pressure chamber 2. Exemplarily, the pressure sensor device comprises a third pressure sensor 13 for detecting an input pressure of the pressure fluid input 7 and/or a fourth pressure sensor 14 for detecting an output pressure at the pressure fluid output 8.

The controller device 20 is configured to perform a closed-loop control, in particular a closed-loop pressure control, of the piezo valve device 30. In particular, the controller device 20 is configured to perform a first closed-loop pressure control of the first output pressure and/or a second closed-loop pressure control of the second output pressure.

The controller device 20 is preferably configured to perform the first closed-loop pressure control of the first output pressure on the basis of the first output pressure detected with the first pressure sensor 11 (as actual output pressure) and a specified setpoint output pressure. The controller device 20 is preferably configured to drive, for the closed-loop control, in particular the first closed-loop pressure control, the first piezo valve 6A with a first drive voltage AS1, and/or the second piezo valve 6B with a second drive voltage AS2, in order to adjust the degree of opening of the respective piezo valve 6A, 6B, so that the actual output pressure is changed towards the setpoint output pressure.

Exemplarily, within the closed-loop control, the first piezo valve 6A is used to supply pressurized fluid to the first pressure chamber 1 and the second piezo valve 6B is used to discharge pressurized fluid from the first pressure chamber 1.

The second closed-loop pressure control of the second output pressure is performed by driving the third piezo valve 6C (with a third drive voltage) and the fourth piezo valve 6D (with a fourth drive voltage). The second closed-loop pressure control is expediently analogous to the first closed-loop pressure control of the first output pressure.

The controller device 20 expediently comprises a computing unit 15, in particular a microcontroller, on which a controller program is preferably executed. The controller device 20 is configured to calculate, with the controller program, the drive voltages, in particular the first drive voltage AS1 and/or the second drive voltage AS2, for the closed-loop control of the piezo valve device, in particular on the basis of the first output pressure and/or the setpoint output pressure.

Figure 2:
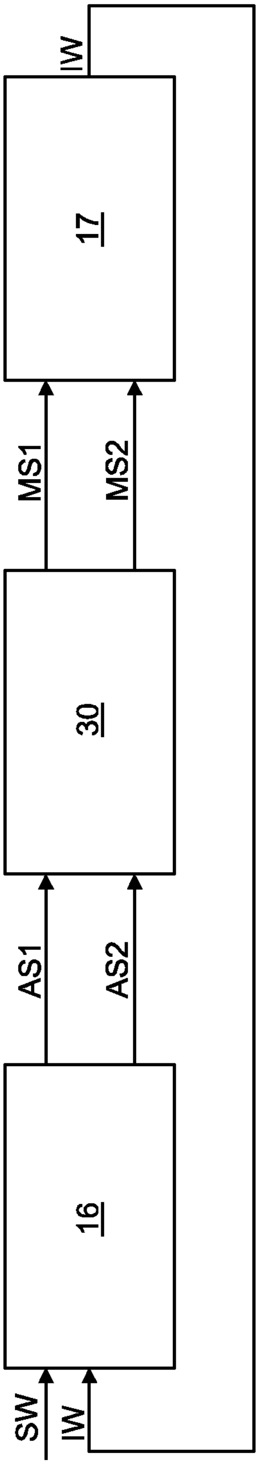

FIG. 2 shows a block diagram of a control loop of the closed-loop control of the piezo valve device 30. In particular, the control loop is used to closed-loop control the first output pressure.

The control loop comprises a controller 16 provided by the controller device, for example by the controller program. The controller 16 receives a setpoint value SW, in particular from a higher-level controller, for example from a programmable logic controller, PLC. The setpoint value SW is, for example, the setpoint output pressure. The controller 16 further receives an actual value IW, for example the actual value of the first output pressure detected by the first pressure sensor 11. The controller 16 calculates the first drive voltage AS1 and the second drive voltage AS2 based on the setpoint value SW and the actual value IW, and in such a way that the actual value IW is changed towards the setpoint value SW.

The control loop comprises the piezo valve device 30, in particular the first piezo valve 6A and/or the second piezo valve 6B. The piezo valve device 30 is driven by the first drive voltage AS1 and/or the second drive voltage AS2 and, in response to this driving, provides with the first piezo valve 6A a first mass flow MS1 of pressurized fluid (from the pressurized fluid source 50) to the first working outlet 3 and/or provides with the second piezo valve 6B a second mass flow MS2 away from the first working outlet (to the pressurized fluid sink 60).

The control loop further comprises a control path 17 (which can also be referred to as "controlled system"), which is formed in particular by the working volume present at the first working outlet 3. The working volume comprises, by way of example, the volume of the first pressure chamber 1 and/or the volume of a fluidic connection between the working outlet 3 and the first pressure chamber 1. The working volume is that volume which is filled via the first working outlet 3 with the pressurized fluid and in which the first outlet pressure is present.

The first mass flow MS1 and/or the second mass flow MS2 is fed to the control path 17, on the basis of mass flows the actual value IW is set, which is fed back to the controller 16.

Figure 3:
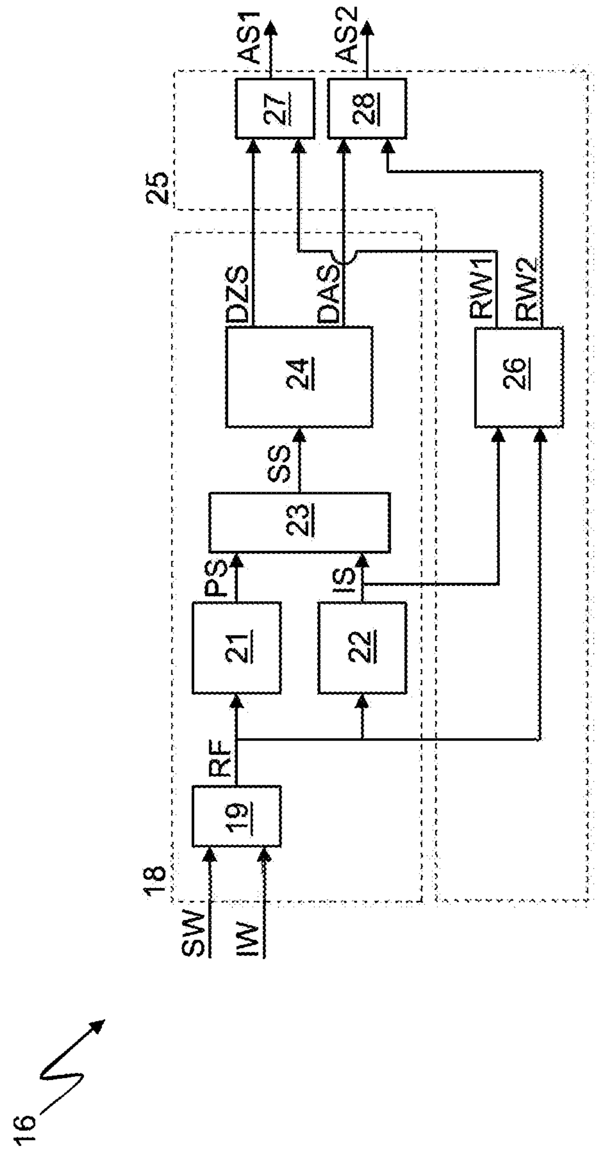

FIG. 3 shows a block diagram of an exemplary embodiment of the controller 16.

Preferably, the controller 16 comprises a controller section 18, which is exemplarily designed as a PI element. The term PI element stands for proportional integrating element. The PI element may also be referred to as a PI controller. Optionally, the controller section 18 may be implemented as a PID element. The term PID element stands for proportional-integrating-differentiating element. The PID element may also be referred to as a PID controller.

The controller section 18 is configured to calculate a pressurized fluid supply signal DZS and/or a pressurized fluid discharge signal DAS on the basis of the setpoint value SW and the actual value IW. The pressurized fluid supply signal DZS is the basis of the first drive voltage AS1 and the pressurized fluid discharge signal DAS is the basis of the second drive voltage AS2.

The controller section 18 comprises a control error element 19 for calculating a control error RF based on the setpoint value SW and the actual value IW. For example, the control error element 19 is configured to calculate the control error RF as the difference between the setpoint value SW and the actual value IW.

In an exemplary embodiment, the controller section 18 comprises a P element 21. The P element 21 may also be referred to as a proportional element. The P element 21 is configured to calculate a proportional signal PS based on the control error RF. For example, the P element 21 is configured to multiply the control error RF by a coefficient in order to calculate the proportional signal PS.

The controller device 20, in particular the controller section 18, is preferably configured to calculate a control error integral signal IS that represents a time integral of the control error RF of the closed-loop control of the piezo valve device 30.

In an exemplary embodiment, the controller section 18 includes an I element 22. The I element 22 may also be referred to as an integrating element. The I element 22 is configured to calculate the control error integral signal IS based on the control error RF. For example, the I element 22 is configured to integrate the control error RF over time to calculate the control error integral signal IS. The control error integral signal IS represents an I component (I component=integrating component) of the PI element.

Exemplarily, the controller section 18 is configured to calculate the pressure fluid supply signal DZS and/or the pressure fluid discharge signal DAS based on the proportional signal PS and the control error integral signal IS. Exemplarily, the controller section 18 comprises a summation element 23 configured to add the proportional signal PS and the control error integral signal IS to obtain a summation signal SS.

In an exemplary embodiment, the controller section 18 further comprises an separating element 24 configured to calculate the pressurized fluid supply signal DZS and/or the pressurized fluid discharge signal DAS based on the summation signal SS. For example, in the case of a positive summation signal SS, the separating element 24 sets the pressure fluid discharge signal DAS to zero (or to a value smaller than zero) and sets the pressure fluid supply signal DZS according to, in particular proportional to, the magnitude of the summation signal SS. For example, in the case of a negative summation signal SS, the separating element 24 sets the pressurized fluid supply signal DZS to zero (or to a value smaller than zero) and sets the pressurized fluid supply signal DAS according to, in particular proportional to, the magnitude of the summation signal SS.

The controller 16 is configured to provide the first drive voltage AS1 based on the pressure fluid supply signal DZS and/or to provide the second drive voltage AS2 based on the pressure fluid discharge signal DAS.

The controller 16 further comprises an adaptation section 25. The adaptation section 25 serves to provide the first drive voltage AS1 such that it is adapted to a first real opening voltage value OW1, in particular to a change in the first real opening voltage value OW1. Expediently, the adaptation section 25 serves to provide the second drive voltage AS2 such that it is adapted to a second real opening voltage value OW2, in particular to a change in the second real opening voltage value OW2.

The first real opening voltage value OW1 is the voltage value that the first drive voltage AS1 must at least have in order for the first piezo valve 6A to start opening. The second real opening voltage value OW2 is the voltage value that the second control voltage AS2 must at least have in order for the second piezo valve 6B to start opening.

The adaptation section 25 is configured to provide the first drive voltage AS1 based on the pressurized fluid supply signal DZS and the control error integral signal IS. The adaptation section 25 is configured to provide the second drive voltage AS2 based on the pressurized fluid discharge signal DAS and the control error integral signal IS.

Preferably, the controller device 20, in particular the adaptation section 25, is designed to adapt at least one control opening voltage value (preferably both control opening voltage values RW1, RW2) on the basis of the control error integral signal IS. Preferably, each control opening voltage value RW1, RW2 defines within the closed-loop control (in particular within the controller program) a respective opening voltage value of a respective piezo valve 6 of the piezo valve device 30. The controller device, in particular the adaptation section 25, is configured to provide, using the at least one control opening voltage value (preferably both control opening voltage values RW1, RW2), at least one drive voltage for driving the piezo valve 6 within the control.

By the term "at least one control opening voltage value" is meant in particular the first control opening voltage value RW1 and the second control opening voltage value.

Preferably, the adaptation section 25 comprises an opening voltage value calculating element 26 configured to calculate the first control opening voltage value RW1 and/or the second control opening voltage value RW2 based on the control error integral signal IS. The first control opening voltage value RW1 is exemplarily a first offset value, which is added to the pressurized fluid supply signal DZS to obtain the first drive voltage AS1. The first control opening voltage value RW1 may also be referred to as the first offset value or the first offset voltage. The second control opening voltage value RW2 is exemplarily a second offset value, which is added to the pressurized fluid discharge signal DAS to obtain the second drive voltage AS2. The second control opening voltage value RW2 may also be referred to as a second offset value or a second offset voltage.

Preferably, the opening voltage value calculating element 26 is adapted to check whether a safety criterion for performing the adjustment of the at least one control opening voltage value is satisfied. In particular, the opening voltage value calculating element 26 is adapted to perform the adjustment of the at least one control opening voltage value in response to the fact that the safety criterion is met.

Exemplarily, the control error RF is supplied to the opening voltage value calculating element 26 and the opening voltage value calculating element 26 checks whether the safety criterion is fulfilled on the basis of the control error RF. For example, the safety criterion is satisfied if the control error RF indicates a steady state of the closed-loop control, for example, if the control error RF is smaller than a predetermined threshold value and/or is constant.

Exemplarily, the adaptation section 25 comprises a first summation element 27 that adds the first control opening voltage value RW1 to the pressure fluid supply signal DZS to obtain the first drive voltage AS1. Exemplarily, the adaptation section 25 comprises a second summation element 28 that adds the second control opening voltage value RW2 to the pressure fluid discharge signal DAS to obtain the second drive voltage AS2.

The controller device 20 is configured to use the control opening voltage values RW1 and/or RW2 to adapt the closed-loop control, in particular the provision of the first drive voltage AS1 and/or the second drive voltage AS2, to a changed real opening voltage value of the respective piezo valve 6. During operation of the piezo valve 6, the real opening voltage value typically changes over time.

Figure 4:
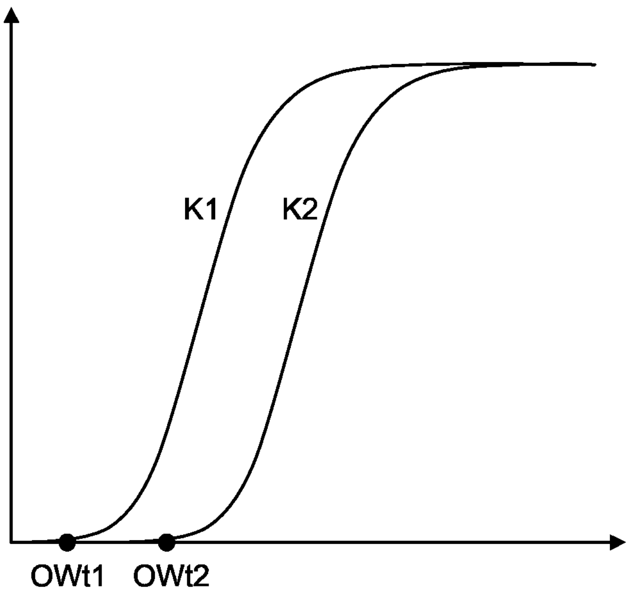

FIG. 4 shows a diagram illustrating a real opening voltage value of a piezo valve 6. The following explanations expediently apply to each piezo valve 6A, 6B, 6C and/or 6D. The drive voltage of the piezo valve 6 is plotted on the horizontal axis of the diagram and the degree of opening of the piezo valve 6 is plotted on the vertical axis. The diagram comprises a first characteristic curve K1, which shows the degree of opening of the piezo valve 6 as a function of the drive voltage at a first point in time. At the first characteristic curve K1, the piezo valve 6 starts to open at a real opening voltage value OWt1; i.e., at a drive voltage greater than the real opening voltage value OWt1, the piezo valve 6 provides a degree of opening greater than zero, and at a drive voltage less than the real opening voltage value OWt1, the piezo valve 6 provides a degree of opening equal to zero.

The diagram includes a second characteristic curve K2, which shows the degree of opening of the piezo valve 6 as a function of the drive voltage at a second point in time. The second characteristic curve has a real opening voltage value OWt2. In the second characteristic curve K2, the real opening voltage value has changed compared to the first characteristic curve K1; by way of example, the real opening voltage value OWt2 is greater than the real opening voltage value OWt1.

Figure 5:
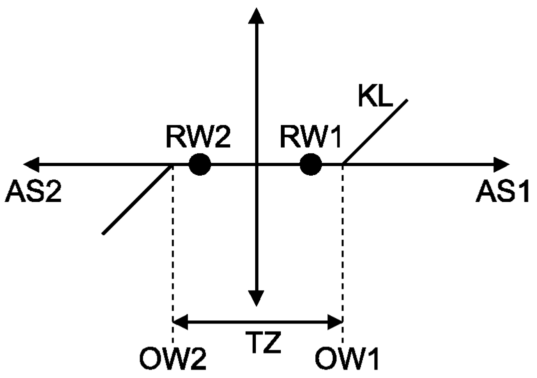

FIG. 5 shows a diagram illustrating different regions of operation of the closed-loop control of the piezo valve device 30. The first drive voltage AS1 is plotted on the right half of the horizontal axis and the second drive voltage AS2 is plotted on the left half of the horizontal axis. The first drive voltage AS1 increases in the rightward direction and the second drive voltage AS2 increases in the leftward direction. The mass flow at the first pressure outlet 3 is plotted on the vertical axis.

In the diagram, a first real opening voltage value OW1 of the first piezo valve 6A and a second real opening voltage value OW2 of the second piezo valve 6B are indicated. The region of operation between the first real opening voltage value OW1 and the second real opening voltage value OW2 is a first region of operation and shall also be referred to as the dead zone TZ. The region outside the first region of operation shall be referred to as the second region of operation.

In the diagram, a characteristic curve KL is drawn which indicates how the mass flow present at the first pressure outlet 3 depends on the setting of the control opening voltage values RW1, RW2 with respect to the real opening voltage values OW1, OW2, in particular in a state in which the closed-loop control provided by the controller device 20 does not actually require any mass flow at the first pressure outlet 3.

Preferably, the controller device 20 is configured to adjust both control opening voltage values RW1, RW2 such that they are within the dead zone TZ. Preferably, the controller device 20 adjusts the first control opening voltage value RW1 so that it is smaller than the first real opening voltage value OW1 and/or adjusts the second control opening voltage value RW2 so that it is smaller than the second real opening voltage value OW2.

If both control opening voltage values RW1, RW2 are in the dead zone TZ, unnecessary consumption of pressurized fluid during the closed-loop control can be prevented.

Preferably, the controller device 20 is designed to adapt the two control opening voltage values RW1, RW2 in such a way that the control error integral signal IS assumes a predetermined oscillation signal shape, in particular an oscillation signal shape of a preferably symmetrical triangular oscillation. The term "signal shape" preferably means "waveform". For this purpose, the controller device 20 expediently performs a waveform analysis, for example a Fourier transform, of the control error integral signal IS, in particular during the adaptation of the two control opening voltage values RW1, RW2, preferably continuously, and preferably performs the adaptation based on the waveform analysis.

Figure 6:
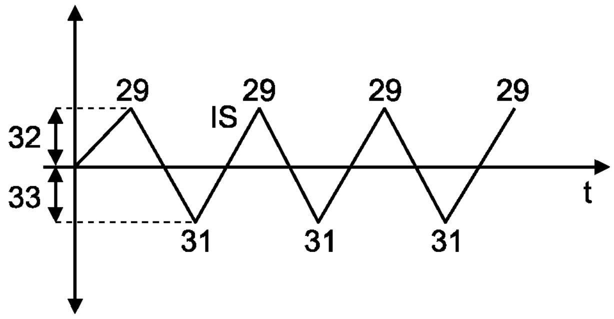

FIG. 6 shows a diagram with a temporal course of the control error integral signal IS in the first region of operation—i.e. in the dead zone TZ. Time is plotted on the horizontal axis and the value of the control error integral signal IS is plotted on the vertical axis. The controller device 20 is expediently configured to adjust the two control opening voltage values RW1, RW2 in such a way that the control error integral signal IS has the signal shape shown in FIG. 6. This signal shape shall also be called dead band signal shape. The control error integral signal IS (with the dead band signal shape) has a periodic signal course. Exemplarily, the control error integral signal IS (with the dead band signal shape) has an oscillation signal shape of a triangular oscillation. The control error integral signal IS (with the dead zone signal shape) has a plurality of positive peaks 29 and negative peaks 31 which alternate and which are expediently connected to each other by straight signal sections, respectively. At the positive peaks 29, the control error integral signal IS has positive values, and at the negative peaks 31, the control error integral signal IS has negative values.

The value of a positive peak 29 of the control error integral signal IS shall be referred to as the positive actual amplitude 32 of the control error integral signal. The value (or magnitude) of a negative peak 31 of the control error integral signal shall be referred to as the negative actual amplitude 33 of the control error integral signal.

Preferably, the controller device 20 is configured to adjust the two control opening voltage values RW1, RW2 such that the magnitude of the positive actual amplitude 32 is equal to the magnitude of the negative actual amplitude 33. This means that the oscillation, in particular the triangular oscillation, is symmetrical.

Figure 7:
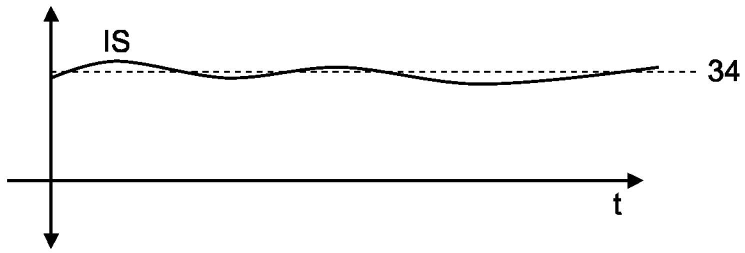

FIG. 7 shows a diagram with a temporal course of the control error integral signal IS in the second region of operation—i.e. outside the dead zone. The time is plotted on the horizontal axis and the value of the control error integral signal IS on the vertical axis. The control error integral signal IS has a periodic signal course. As an example, the control error integral signal IS has an oscillation signal form of a sinusoidal oscillation. The control error integral signal IS in the second region of operation is continuously positive and exemplarily at no time negative. Exemplarily, the control error integral signal IS oscillates around a positive mean value 34

Figure 8:
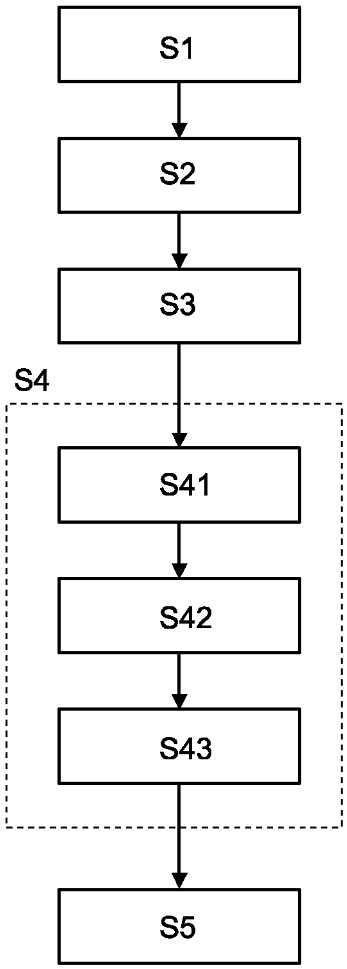

FIG. 8 shows a flow diagram of a method for closed-loop controlling the piezo valve device 30. The closed-loop control is exemplarily a closed-loop pressure control, in particular a closed-loop pressure control of the first output pressure at the first working outlet 3.

The method starts with an optional step S1, in which the closed-loop control is started, in particular before the adjustment of the at least one control opening voltage value has been performed. By the expression "at least one control opening voltage value" is meant in particular the first control opening voltage value RW1 and the second control opening voltage value RW2. The adaptation of the at least one control opening voltage value then expediently takes place during closed-loop control—i.e. in particular during ongoing operation. During the closed-loop control, the controller device 20 controls an actual value IW (in particular the first output pressure) to a setpoint value SW (in particular a predetermined setpoint output pressure) by driving the piezo valve device 30. The closed-loop control is initially performed with a non-adjusted at least one control opening voltage value.

The method continues with step S2. In step S2, a calculation of the control error integral signal IS is performed, which represents a time integral of the control error RF of the closed-loop control of the piezo valve device 30. Expediently, the controller device 20 calculates the control error integral signal IS in the step S2, on the basis of which control error integral signal IS the adjustment of the at least one control opening voltage value is then performed. Expediently, the controller device 20 already calculates the control error integral signal IS within (and for the purpose of) the closed-loop control of the piezo valve device 30, and/or provides, for example, the drive voltages AS1, AS2 on the basis of the control error integral signal IS calculated in step S2.

Optionally, the method comprises a step S3 in which the controller device 20 checks whether a safety criterion for performing an adjustment of the at least one control opening voltage value is satisfied, the adjustment being performed (in subsequent step S4) in response to the safety criterion being satisfied. Expediently, the controller device 20 proceeds with adjusting the at least one control opening voltage value in response to the safety criterion being satisfied. Expediently, the controller device 20 does not proceed with adjusting the at least one control opening voltage value as long as the safety criterion is not fulfilled.

For example, the safety criterion is satisfied by the fact that there is a steady state of the closed-loop control of the piezo valve device 30. For example, the controller device 20 checks as the safety criterion whether the control error RF is constant and/or smaller than a predetermined threshold value. Preferably, the controller device 20 checks as the safety criterion whether the setpoint value SW and/or the actual value IW is constant.

Expediently, the controller device 20 proceeds with the method only when the safety criterion is met, i.e., in particular, in response to one, more, or all of the aforementioned checks being passed.

By means of checking the safety criterion, the controller device 20 can ensure that the adjustment of the at least one control opening voltage value occurs in a state in which the adjustment does not impair the closed-loop control continuing to operate during the adjustment.

The method expediently continues with step S4 in which, based on the control error integral signal IS, the at least one control opening voltage value defining within the closed-loop control an opening voltage value of a piezo valve 6 of the piezo valve device 30 is adjusted. In particular, the controller device 20 adjusts the first control opening voltage value RW1 and/or the second control opening voltage value based on the control error integral signal IS.

Preferably, in step S4 the at least one control opening voltage value (preferably both control opening voltage values RW1, RW2) is adapted in such a way that the control error integral signal IS assumes a predetermined oscillation signal shape, in particular an oscillation signal shape of a preferably symmetrical triangular oscillation.

Preferably, in step S4 the at least one control opening voltage value is adjusted such that it is smaller than a real opening voltage value of the respective piezo valve 6. For example, the first control opening voltage value RW1 is adapted such that it is smaller than the real opening voltage value OW1 of the first piezo valve 6A. For example, the second control opening voltage value RW2 is adjusted such that it is smaller than the real opening voltage value OW2 of the second piezo valve 6B.

Preferably, the calculation S3 of the control error integral signal IS and/or the adjustment S4 of the at least one control opening voltage value (in particular both control opening voltage values RW1, RW2) is performed during the closed-loop control, in particular the closed-loop pressure control, of the piezo valve device 30. The closed-loop control, in particular the closed-loop pressure control, of the piezo valve device 30 preferably comprises a PI control or a PID control, and the control error integral signal IS is expediently an I component of the PI control or the PID control.

Preferably, in the adjusting in step S4, the first control opening voltage value RW1 is adjusted first, while the second control opening voltage value RW2 is not adjusted, and the second control opening voltage value RW2 is adjusted only after the first control opening voltage value RW1 has been adjusted. Preferably, after adjusting the first control opening voltage value RW1, the second control opening voltage value RW2 is adjusted together (in particular simultaneously) with a further adjustment of the first control opening voltage value RW1.

Exemplarily, the step S4 comprises a first sub-step S41 in which the controller device 20 first adjusts one of the two control opening voltage values RW1, RW2 and expediently during this time does not yet adjust the other of the two control opening voltage values RW1, RW2.

The controller device 20 performs the first substep S41 in particular in response to the fact that the closed-loop control is in the second region of operation—that is, outside the dead zone TZ—and/or on the basis of the oscillation signal shape of the control error integral signal IS, in particular in response to the fact that the control error integral signal IS has an oscillation signal shape other than a triangular oscillation, for example a sinusoidal signal shape.

In response to the fact that the closed-loop control is already in the first region of operation, the controller device 20 does not execute the sub-step S41 (and preferably the sub-step S42) and continues immediately with the sub-step S43.

Expediently, at the first sub-step S41, the controller device 20 decreases one of the two control opening voltage values RW1, RW2 and expediently keeps the other of the two control opening voltage values RW1, RW2 constant.

For example, in the substep S41, the controller device 20 first adjusts the first control opening voltage value RW1 (in particular by decreasing it) and, meanwhile, does not adjust the second control opening voltage value RW2. The controller device 20 performs this adjustment in particular in response to the fact that the control error integral signal has a negative mean value and/or the control error integral signal is continuously negative and/or the control error integral signal has an oscillation signal shape other than a triangular oscillation, for example a sinusoidal signal shape.

Expediently, in the sub-step S41, during the reduction of the first control opening voltage value RW1, the controller device 20 checks whether (while closed-loop control is in progress) the mean value of the control error integral signal IS is reduced and, in response thereto, continues the reduction of the first control opening voltage value RW1 until the mean value is zero or until the mean value is no longer reduced.

In response to the mean value not decreasing during the decrease of the first control opening voltage value RW1, the controller device 20 stops decreasing the first control opening voltage value RW1 and instead increases the second control opening voltage value RW2 until the mean value is zero or until the mean value is no longer decreased.

Alternatively, in the sub-step S41, the controller device 20 first adjusts the second control opening voltage value RW2 (in particular by decreasing it) and, meanwhile, does not adjust the first control opening voltage value RW1. The controller device 20 performs this adjustment in particular in response to the fact that the control error integral signal has a positive mean value and/or the control error integral signal is continuously positive and/or the control error integral signal has an oscillation signal shape other than a triangular oscillation, for example a sinusoidal signal shape.

Expediently, in the sub-step S41, during the reduction of the second control opening voltage value RW2, the controller device 20 checks whether the mean value of the control error integral signal IS increases (while closed-loop control is in progress) and, in response thereto, continues the reduction of the second control opening voltage value RW2 until the mean value is zero or until the mean value is not increased further.

In response to the mean value not increasing during the decrease of the second control opening voltage value RW2, the controller device 20 stops decreasing the second control opening voltage value RW2 and instead increases the first control opening voltage value RW21 until the mean value is zero or until the mean value is no longer increased.

The method continues with the substep S42, in which the controller device adjusts the first control opening voltage value RW1 together with the second control opening voltage value RW2 (in particular simultaneously), in particular reduces it, preferably until the control error integral signal IS has a triangular oscillation as oscillation signal form and/or until the closed-loop control is in the first region of operation.

The method continues with substep S43, in which the first control opening voltage value RW1 and/or the second control opening voltage value RW2 are adjusted so that the control error integral signal IS has a symmetrical triangular signal shape as the oscillation signal shape.

Preferably, the at least one control opening voltage value is adjusted such that an actual amplitude of the control error integral signal IS is equal to a setpoint amplitude. For example, the first control-opening voltage value RW1 is adapted based on the positive actual amplitude 32 of the control-error integral signal IS and/or the second control-opening voltage value RW2 is adapted based on the negative actual amplitude 33 of the control-error integral signal IS. For example, the first control opening voltage value RW1 is adapted such that the positive actual amplitude 32 is equal to a (predetermined) positive setpoint amplitude of the control error integral signal IS and/or the second control opening voltage value RW2 is adapted such that the negative actual amplitude 33 is equal to a (predetermined) negative setpoint amplitude of the control error integral signal IS. The positive setpoint amplitude and/or the negative setpoint amplitude are expediently calculated by the controller device 20 and/or specified externally, for example by a user input or by the higher-level controller.

The method continues with step S5. In step S5, using the adapted at least one control opening voltage value, at least one drive voltage is provided for driving the piezo valve 6 as part of the closed-loop control, in particular the closed-loop pressure control, of the piezo valve device 30. By way of example, in step S5, the controller device 20 provides the first drive voltage AS1 using the adapted first control opening voltage value RW1 and provides the second drive voltage AS2 using the adapted second control opening voltage value RW2. In step S5, the controller device 20 performs closed-loop control of the piezo valve device 30 using the first control opening voltage value RW1 and the second control opening voltage value RW2.

Preferably, the controller device continuously performs further adjustments of the first control opening voltage value RW1 and/or the second control opening voltage value RW2 during the closed-loop control of the piezo valve device 30, in particular as explained above on the basis of the positive actual amplitude 32 and/or the negative actual amplitude 33.

Further exemplary details are to be explained below.

The controller device 20 is preferably configured to execute an adaptation and/or identification algorithm in which the adaptation, in particular shift, of the control opening voltage values RW1, RW2 explained above is carried out, in particular during ongoing operation and/or initially. Expediently, the controller device 20 identifies a change in the real opening voltage values OW1, OW2 and compensates for it by adapting the control opening voltage values RW1, RW2, in particular during ongoing operation and/or initially.

An adjustment during ongoing operation means in particular that an application for which the fluidic system 10 is used is running as intended (in particular with the closed-loop control of the piezo valve device 30 being carried out) and during this time the adjustment of the control opening voltage values RW1, RW2 is carried out. In particular, during the adjustment no stop of the application and/or no change of a controlled variable, for example of the first output pressure, takes place by which the application is impaired, in particular disturbed.

An initial adjustment means that the control opening voltage values are adjusted, in particular identified, once in a production at the end of the line or in the field by a user (for example during commissioning) by triggering. This process can be done by an external triggering (for example by an electrical signal or data bus) or automatically at a valve start.

Preferably, in the fluidic system 10, the real mass flow at the first working outlet 3 is not measured and/or is not used for the adjustment of the control opening voltage values RW1, RW2.

Expediently, the pressure at the first working outlet 3 can be measured and used to adjust the control opening voltage values RW1, RW2.

Preferably, the first drive voltage AS1 and the second drive voltage AS2 can be specified independently of each other.

Preferably, phases of a constant setpoint value SW and a constant actual value IW are present during operation. Expediently, the adjustment of the control opening voltage values RW1, RW2 is performed in one of these phases.

The controller device 20 is expediently configured to provide closed-loop control of the piezo valve device 30 using a closed-loop control algorithm. The closed-loop control algorithm preferably comprises a PI controller and the adaptation algorithm, which is used to adapt the control opening voltage values.

The adaptation algorithm optionally uses characteristic quantities from the temporal courses of the I component (i.e., the control error integral signal IS), P component (i.e., the proportional signal PS), the manipulated variable (in particular, the first drive voltage AS1 and/or the second drive voltage AS2) and/or the control error RF, and/or further measurement and/or calculation quantities to adapt the control opening voltage values RW1, RW2. The characteristic quantities may in particular comprise: amplitudes, mean values, symmetries, Fourier and correlation analyses, period times and signal shapes (sinusoidal shape, triangular shape, rectangular shape).

The control opening voltage values RW1, RW2 are expediently adapted to produce a triangular oscillation (in particular of the control error integral signal IS), on the basis of which the real opening voltage values OW1, OW2 can optionally be determined.

The controller device 20 is thus in particular configured to perform an adaptation of the control opening voltage values RW1, RW2 and/or an identification of the real opening voltage values OW1, OW2 of the valve characteristics of the piezo valves 6A, 6B on the basis of a oscillation analysis, in particular of the control integral signal IS.

Expediently, the controller device 20 is configured to perform the adjustment and/or identification without direct measurement of a mass flow and/or without a model-based disturbance observer and/or without a model-based method, e.g. calculation of a real conductance from a pressure change.

What is claimed is:

1. A method for closed-loop controlling a piezo valve device having at least one piezo valve, wherein the piezo valve has a real opening voltage value which is the voltage value with which the piezo valve must at least be driven so that it begins to open, wherein, within the closed-loop control, a control opening voltage value is used to follow changes in the real opening voltage value, the method comprising the steps:

calculating a control error of the closed-loop control of the piezo valve device based on difference between a setpoint value and an actual value;

calculating a proportional signal multiplying the control error by a coefficient;

calculating a control error integral signal representing a time integral of the control error;

calculating a pressurized fluid supply signal based on the proportional signal and the control error integral signal;

adjusting, based on the control error integral signal, the control opening voltage value;

adding the adjusted control opening voltage value as an offset value to the pressurized fluid supply signal to obtain at least one drive voltage for driving the piezo valve device within the closed-loop control; and providing the at least one drive voltage to the piezo valve device to drive the piezo valve within the closed-loop control.

2. The method according to claim 1, wherein the control opening voltage value is adjusted such that the control error integral signal assumes a predetermined oscillation signal shape.

3. The method according to claim 2, wherein the predetermined oscillation signal shape is an oscillation signal shape of a triangular oscillation.

4. The method according to claim 2, wherein the predetermined oscillation signal shape is an oscillation signal shape of a symmetrical triangular oscillation.

5. The method according to claim 1, wherein the control opening voltage value is adjusted such that an actual amplitude of the control error integral signal is equal to a setpoint amplitude.

6. The method according to claim 1, wherein the control opening voltage value is adjusted to be smaller than an actual opening voltage value of the respective piezo valve.

7. The method according to claim 1, wherein the calculating of the control error integral signal takes place during the closed-loop control of the piezo valve device.

8. The method according to claim 1, further comprising checking whether a safety criterion for performing the adjusting is satisfied, wherein the adjusting is performed in response to the safety criterion being satisfied.

9. The method according to claim 1, wherein the closed-loop control comprises a PI control or a PID control, and the control error integral signal is an I-component of the PI control or the PID control.

10. The method according to claim 1, wherein the adjusting comprises adjusting a first control opening voltage value of a first piezo valve of the piezo valve device and adjusting a second control opening voltage value of a second piezo valve of the piezo valve device, and wherein the providing of the drive voltage comprises providing, using the first control opening voltage value, a first drive voltage for driving the first piezo valve within the closed-loop control, and providing, using the second control opening voltage value, a second drive voltage for driving the second piezo valve within the closed-loop control.

11. The method according to claim 10, wherein, within the closed-loop control, the first piezo valve is used to supply pressurized fluid to a pressure chamber, and the second piezo valve is used to discharge pressurized fluid from the pressure chamber.

12. The method according to claim 10, wherein, in the adjusting, the first control opening voltage value is adjusted first, while the second control opening voltage value is not adjusted, and only after adjusting the first control opening voltage value, the second control opening voltage value is adjusted.

13. The method according to claim 12, wherein after adjusting the first control opening voltage value, adjusting the second control opening voltage value is performed together with a further adjusting of the first control opening voltage value.

14. The method according to claim 10, wherein the first control opening voltage value is adjusted based on a positive actual amplitude of the control error integral signal and wherein the second control opening voltage value is adjusted based on a negative amplitude of the control error integral signal.

15. The method according to claim 1, wherein the piezo valve is part of a bridge circuit of the piezo valve device.

16. The method according to claim 1, wherein the closed-loop control of the piezo valve device is a closed-loop pressure control.

17. The method according to claim 1, wherein the adjusting of the control opening voltage value takes place during the closed-loop control of the piezo valve device.

18. A controller device for closed-loop pressure controlling a piezo valve device having at least one piezo valve, wherein the piezo valve has a real opening voltage value which is the voltage value with which the piezo valve must at least be driven so that it begins to open, wherein, within the closed-loop control, a control opening voltage value is used to follow changes in the real opening voltage value, the controller device being configured to:

calculate a control error of the closed-loop control of the piezo valve device based on difference between a setpoint value and an actual value, calculate a proportional signal multiplying the control error by a coefficient;

calculate a control error integral signal which represents a time integral of the control error, calculate a pressurized fluid supply signal based on the proportional signal and the control error integral signal, adapt the control opening voltage value based on the control error integral signal, add the adapted control opening voltage value as an offset value to the pressurized fluid supply signal to obtain at least one drive voltage for driving the piezo valve device within the closed-loop control, and provide the at least one drive voltage to the piezo valve device to drive the piezo valve within the closed-loop control.

19. A fluidic system comprising a controller device according to claim 18 and the piezo valve device.

* * * * *